UNITED STATES PATENT OFFICE.

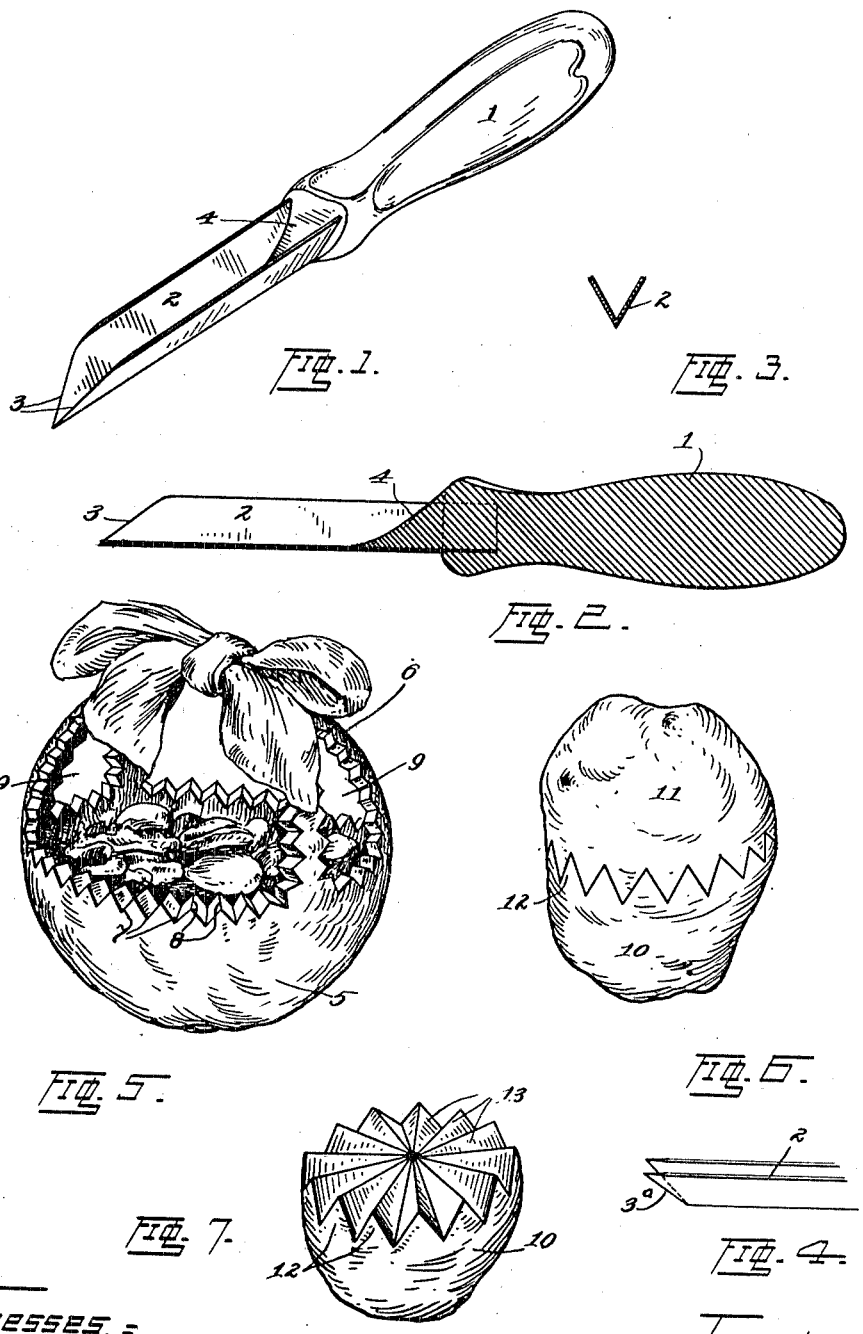

CHRISTINE ERIKSON, OF SOUTH BEND, INDIANA.

CULINARY KNIFE.

1,117,355.  Specification of Letters Patent.  Patented Nov. 17, 1914.

Application filed January 9, 1913. Serial No. 740,915.

*To all whom it may concern:*

Be it known that I, CHRISTINE ERIKSON, a citizen of the United States, residing at South Bend, in the county of St. Joseph and State of Indiana, have invented a certain new and useful Improvement in Culinary Knives, of which the following is a full, clear, and exact description, reference being had to the accompanying drawings.

This invention relates to knives and particularly to knives whereby fruit, vegetables, and other objects may be cut in such manner as to present an ornamental appearance.

It is the general object of the invention to produce a knife which will secure the above results in an efficient manner, which will be sanitary in use, and which may be produced at a comparatively small expense.

With the foregoing objects in view, the invention may be considered further as consisting of the combinations of elements set forth in the claims hereto annexed and illustrated in the drawings forming part hereof wherein:

Figure 1 represents a perspective view of a knife constructed in accordance with my invention; Fig. 2 a longitudinal sectional view through the knife; Fig. 3 a transverse sectional view through the blade; Fig. 4 a perspective of a modified form thereof; while Figs. 5, 6, and 7 are perspective views showing the manner in which ornamental patterns or designs may be cut in fruit, vegetables, and the like by the knife of my invention.

Describing the various parts by reference characters, 1 denotes the handle and 2 the blade of my knife, the handle being of any suitable material, as aluminum, and the blade being preferably of thin steel, V-shaped in cross section. The end of the blade is preferably beveled, as shown at 3 and the inclined edges are sharpened. For the purpose of preventing the accumulation of material at the joint between the handle and the blade, that part of the handle which is between the diverging branches of the blade is tapered downwardly, as shown at 4, the edges of this tapered portion of the handle forming a tight joint with the coöperating portions of the blade. This surface 4 is not only tapered, but is preferably concaved.

In Fig. 5 there is shown the outward covering or peel of an orange which is formed into basket shape, the body portion being indicated at 5 and the handle at 6. The edges of the lateral openings defined by the body and the sides of the handle are provided with V-shaped alternating grooves 7 and inverted V-shaped ribs 8. The handle portions 6 are shown as provided with openings 9 therein, the bounding edges whereof are finished in a similar manner.

In Fig. 6 there is shown a potato which has been cut in two by my knife, the two sections 10 and 11 not having been separated, while in Fig. 7 there is shown one of the sections of the potato which illustrates the manner in which my knife is capable of operating to produce an ornamental appearance in the vegetable. In producing the ornamental appearance shown particularly in Fig. 7, the knife is applied to the potato with the blade substantially perpendicular with respect to the surface of the potato, the blade being inserted in such manner that one of its top edges will join the top edge of the cut that has been formed by the other side or branch of the blade. The blade is pushed inward directly toward the center of the potato (or other article) preserving as nearly as possible the same plane at each insertion of the blade. When the last cut has been made and the sections separated, the surfaces of these sections will present a star-like appearance as shown in Fig. 7, the alternating ribs 12 and grooves 13 gradually diminishing in width from the surface to the center.

By the construction of knife disclosed herein, it is possible to produce these ornamental patterns or designs in fruit, vegetables, and other articles, and particularly to secure uniformity in the dimensions and appearance of the grooves and ridges. The inclined end of the blade 2 is adapted for the removal of eyes, spots, etc. from vegetables; and the knife is especially adapted for the removal of cores from apples. Furthermore the peculiar formation of the joint 4 between the handle 1 and blade 2 prevents the accumulation and retention of matter at the junction of the knife and handle and facilitates the cleansing and sterilizing of these parts.

In the modified form of blade shown in Fig. 4, the forward end of the blade is beveled in the reverse direction to that illustrated in Figs. 1 and 2, the inclined edges 3ª being sharpened as in the former instance. While this form of blade does not afford such a desirable instrument for removing eyes, specks, cores, and the like from vegetables and fruits, it has the advantage of presenting to the surface of the object to be cut, two points which may be placed in proper alinement with the tops of previously made insertions, and one of the said points may be placed at the exact edge of the last insertion, eliminating the need of calculation in order to produce an even effect and resulting in a consequent saving of time, which is an important item when the knife is used for preparing food in such places as hotels and restaurants where it is necessary to accomplish a considerable amount of work in a comparatively short time.

Having thus described my invention, what I claim is:

1. As a new article of manufacture, a knife comprising a handle and a blade, the blade being of thin metal, substantially V-shaped in cross section, and having its outer end beveled from top to bottom and sharpened to form inclined cutting edges.

2. A knife having a substantially V-shaped blade and a handle, the portion of the handle which is in the V-shaped space between the branches of the blade inclined downwardly to the bottom of such V-shaped space and the upper surface of such portion of the handle being concaved.

In testimony whereof, I hereunto affix my signature in the presence of two witnesses.

CHRISTINE ERIKSON.

Witnesses:
R. L. BRUCK,
BRENNAN B. WEST.